US010675994B2

(12) United States Patent
Fitzpatrick et al.

(10) Patent No.: US 10,675,994 B2
(45) Date of Patent: Jun. 9, 2020

(54) VEHICLE WITH INWARDLY ROTATING SEAT

(71) Applicant: Faurecia Interior Systems, Inc., Auburn Hills, MI (US)

(72) Inventors: Robert Fitzpatrick, Holland, MI (US); Matthew Benson, Holland, MI (US); Desmond O'Regan, Bad Homburg (DE); Markus Uhlig, Stuttgart (DE); Fabrice Aycoberry, St. Germaine en Laye (FR)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 15/957,171

(22) Filed: Apr. 19, 2018

(65) Prior Publication Data

US 2018/0304779 A1  Oct. 25, 2018

Related U.S. Application Data

(60) Provisional application No. 62/487,064, filed on Apr. 19, 2017.

(51) Int. Cl.
*B60N 2/14* (2006.01)
*B62D 31/00* (2006.01)
*B60N 2/64* (2006.01)
*B60N 2/005* (2006.01)
*B60N 2/06* (2006.01)

(52) U.S. Cl.
CPC .............. *B60N 2/14* (2013.01); *B60N 2/005* (2013.01); *B60N 2/06* (2013.01); *B60N 2/64* (2013.01); *B62D 31/003* (2013.01)

(58) Field of Classification Search
CPC . B60N 2/14; B60N 2/005; B60N 2/06; B60N 2/64; B60N 2/146; B62D 31/003
USPC ........................................................ 296/65.06
See application file for complete search history.

(56) References Cited

U.S. PATENT DOCUMENTS

| 5,639,141 A | 6/1997 | Hanemaayer |
| 5,707,103 A | 1/1998 | Balk |
| 5,981,746 A | 11/1999 | Wolfbeis et al. |

(Continued)

FOREIGN PATENT DOCUMENTS

| DE | 102005041735 A1 | 3/2007 |
| DE | 102009050968 A1 | 5/2010 |

(Continued)

*Primary Examiner* — Joseph D. Pape
(74) *Attorney, Agent, or Firm* — Reising Ethington P.C.

(57) ABSTRACT

A vehicle seat with a seat bottom and backrest is configured for movement between a forward-facing position and an inwardly-rotated position in a reconfigurable vehicle passenger cabin. The movement includes rotation about a vertical axis located along an inboard side of the seat and a rear side of the seat bottom. The vertical axis can be located within an inboard quarter of the seat, rearward of an occupant seating surface of the seat bottom, forward or rearward of a rear side of a bottom end of the backrest, and various combinations of these locations. In addition to providing a seat occupant with additional freedom of movement within the passenger cabin, the inwardly-rotated position of the seat can also provide a safer condition for the seat occupant with respect to structural portions of the vehicle body.

13 Claims, 3 Drawing Sheets

(56) References Cited

U.S. PATENT DOCUMENTS

| | | | |
|---|---|---|---|
| 7,204,554 B2 | 4/2007 | Wieclawski | |
| 7,380,859 B2 * | 6/2008 | Gardiner | B60N 2/01 296/64 |
| 8,182,014 B2 * | 5/2012 | Mabuchi | B60N 2/01 296/64 |
| 9,463,715 B1 | 10/2016 | Rawlinson et al. | |

FOREIGN PATENT DOCUMENTS

| | | |
|---|---|---|
| EP | 3044036 B1 | 5/2017 |
| WO | WO2009083773 A1 | 7/2009 |

\* cited by examiner

VEHICLE WITH INWARDLY ROTATING SEAT

TECHNICAL FIELD

The present disclosure relates generally to personal automotive vehicles with reconfigurable passenger cabins and is particularly pertinent to autonomous vehicles.

BACKGROUND

Personal automotive vehicles have evolved over several decades to require less attention from a human driver during vehicle operation. For instance, modern automobiles may be equipped with headlights that self-illuminate in low lighting conditions, windshield wipers that self-activate during rainy weather, or climate-control systems that automatically regulate the temperature of the passenger cabin, to name a few examples. Emerging technologies now enable automobiles to continuously monitor surrounding road and traffic conditions, have real-time knowledge regarding the global position of the vehicle, and to control vehicle acceleration, braking, and navigation based on this information. The trend is toward fully autonomous vehicles, in which little to no attention to vehicle operation is required from vehicle occupants once a destination for the vehicle is determined. In such vehicles, vehicle occupants are free to turn their attention to matters other than driving, such as work-related tasks, entertainment, or relaxation.

During the transition from traditional driver-operated vehicles to fully autonomous vehicles, reconfigurable passenger cabins may be employed to accommodate both a driver mode and an autonomous mode. With driver attention to vehicle operation not required in the autonomous mode, the driver may wish to assume a different or more comfortable seating position than the one required during traditional vehicle operation, in which driver feet must be near the accelerator and brake pedal and driver arms must be able to reach and turn the steering wheel, operate turn signals, etc. Indeed, in traditional driver-operated vehicles, there is very little room available for occupants to assume different seating positions. This is particularly true in the front row of seats where the driver and/or passenger is closely surrounded by a center console, instrument panel(s), arm rests, and steering wheel. It may thus become desirable to increase the amount of free space surrounding the vehicle occupants in the autonomous vehicle mode to allow more freedom of movement. This comes with a whole new set of problems not before encountered in a vehicle passenger cabin.

Various rotating vehicle seat configurations have been proposed. U.S. Pat. No. 5,639,141 to Hanemaayer discloses a driver seat in a recreational vehicle that can rotate 360° to double as a dinette chair or bed when the recreational vehicle is parked. U.S. Pat. No. 5,707,103 to Balk discloses a rear vehicle seat that, when the seat bottom is folded-up, can rotate to a stored position along one side of the interior of the passenger cabin to provide increased usable cargo space in the cabin. U.S. Pat. No. 6,981,746 to Chang et al. discloses a front vehicle seat that rotates more than 90° toward a vehicle door to provide easier passenger ingress or egress, and U.S. Pat. No. 7,204,554 to Wieclawski et al. discloses a vehicle seat that rotates 35-60° toward a vehicle door for similar reasons.

SUMMARY

In accordance with an embodiment, a personal automotive vehicle having a reconfigurable passenger cabin includes a vehicle body having a vertical pillar and a longitudinal axis, a door opening that provides passenger access into and out of the passenger cabin, a seat comprising a seat bottom and a backrest and having an inboard side and an opposite outboard side located between the inboard side and the door opening, and a coupling device that movably couples the seat with the vehicle body for movement between a forward-facing position and an inwardly-rotated position. The door opening is partly defined by the vertical pillar, and the seat bottom has a front side and an opposite rear side. The movement includes rotation about a vertical axis located along the inboard side of the seat and along or behind the rear side of the seat bottom. The seat is located in the passenger cabin so that at least a portion of the seat is longitudinally located at the vertical pillar when the seat is in at least one of said positions.

In some embodiments, the vertical axis is located along the rear side of the seat bottom.

In some embodiments, the vertical axis is located within a vertically projected area of the backrest.

In some embodiments, the seat bottom comprises an occupant seating surface and the vertical axis is located rearward of the seating surface.

In some embodiments, the seat is located in the passenger cabin so that at least a portion of the backrest is longitudinally located at the vertical pillar when the seat is in at least one of said positions.

In some embodiments, the vertical axis is located within an inboard quarter of the seat.

In some embodiments, the vertical axis is located forward of a rear side of a bottom end of the backrest.

In some embodiments, the vertical axis is located rearward of a rear side of a bottom end of the backrest.

In some embodiments, the vertical axis is moveable with respect to the vehicle body.

In some embodiments, the coupling device prevents movement away from the forward-facing position toward an outwardly-rotated position.

In some embodiments, the seat is one of a front row of seats.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a vehicle seat for use in a reconfigurable passenger cabin. The seat is moveable between a forward-facing position and an inwardly-rotated position. In addition to providing a seat occupant with additional freedom of movement within the passenger cabin, the inwardly-rotated position of the seat can also provide a safer condition for the seat occupant with respect to structural portions of the vehicle body. While presented in the context of a front row of seats in the passenger cabin of an autonomous vehicle, the teachings presented herein are applicable to non-autonomous vehicles as well. For example, the unconventional passenger cabin configurations presented here may be employed while a vehicle is parked and/or used with second or third row seating.

Figure 1:
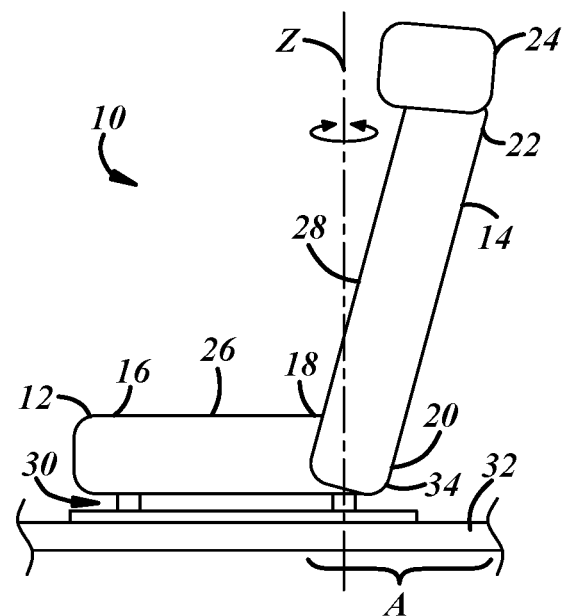
FIG. 1 is a schematic side view of a seat coupled with a vehicle body for movement including rotation about a vertical axis.

FIG. 1 is a schematic side view of a seat 10 configured for used in a reconfigurable passenger cabin of a personal automotive vehicle. As used herein, the term "personal automotive vehicle" includes vehicles intended primarily for personal use that usually have one to three rows of seats and are generally sized to fit in home garages and standard-size parking spaces. Examples include passenger cars, coupes, sedans, SUVs, cross-over vehicles, and light-duty pick-up trucks.

The seat 10 includes a seat bottom 12 and a backrest 14. The seat bottom 12 has a front side 16 and an opposite rear side 18. The backrest 14 has a bottom end 20 coupled with the rear side 18 of the seat bottom 12 and extends to a top end 22, where a headrest 24 may be fitted to the backrest. The backrest 14 may be coupled with the seat bottom 12 for selective pivotal movement about a horizontal pivot axis, such as via a recliner mechanism. The seat bottom 12 has an upward-facing occupant seating surface 26 exposed to the passenger cabin upon which a seat occupant is supported when seated on the seat 10. Likewise, the backrest 14 has a forward-facing occupant seating surface 28 exposed to the passenger cabin along which the seat occupant is supported.

A coupling device 30 couples the seat 10 with a vehicle body 32 for movement with respect to the vehicle body. The movement includes rotation about a vertical axis Z located along the rear side 18 of the seat bottom 12 as shown. The coupling device 30 may accommodate other types of movement and/or other degrees of freedom to the seat 10 with respect to the vehicle body 32, such as forward and rearward movement, titling movement, movement of the vertical axis Z during seat rotation, or rotational movement about an axis other than the vertical axis Z. In the particularly illustrated example, the vertical axis Z is located rearward of the occupant seating surface 26 of the seat bottom 12 and forward of a rear side 34 of the bottom end 20 of the backrest 14. In other embodiments, the vertical axis Z may be located along the seating surface 26 of the seat bottom 12, rearward of the rear side 34 of the bottom end 20 of the backrest 14, rearward of the seat bottom 12, within a vertically projected area A of the backrest 14, or rearward of the seat 10.

Figure 2:
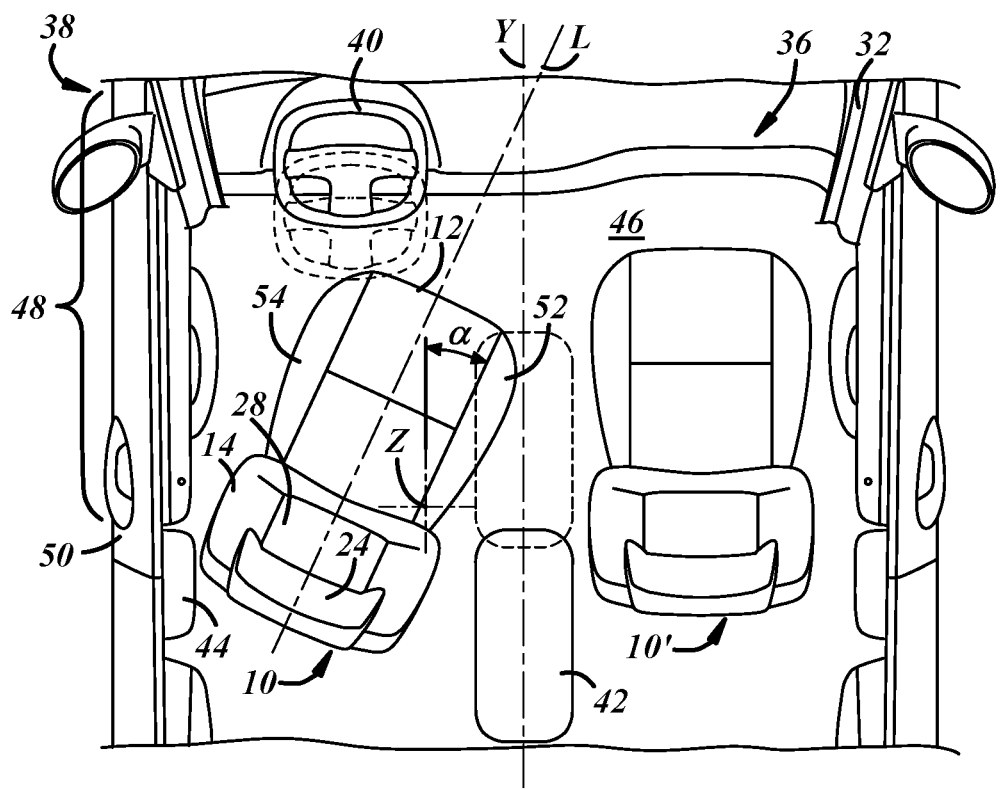
FIG. 2 is a top view of a reconfigurable passenger cabin, illustrating a seat inwardly-rotated about a vertical axis.

FIG. 2 is a top view of the interior of a passenger cabin 36 of a personal automotive vehicle 38 equipped with a moveable seat 10 consistent with that of FIG. 1. The illustrated passenger cabin 36 is reconfigurable between a driving configuration and an autonomous configuration. FIG. 2 shows the passenger cabin 36 in one example of an autonomous configuration in which the seat 10 is rotated away from a forward-facing position of the driving configuration to an inwardly-rotated position. Other characteristics of the autonomous configuration of the passenger cabin 36 may include a steering wheel 40 being in a retracted position, farther forward in the vehicle 38 than when in the driving configuration, and a center console 42 in a stowed position, farther rearward and/or lower than when in the driving configuration. In this example, the inwardly-rotatable seat 10 is one of a front row of transversely spaced apart seats that includes a second seat 10' coupled with the vehicle body 32 in the passenger cabin 36. One or more of the seats of each row of seats may be configured for movement with respect to the vehicle body 32 as described herein.

The seat 10 is coupled with the vehicle body 32 for movement between the forward-facing position and the illustrated inwardly-rotated position. The second seat 10' is illustrated in a forward-facing position, facing a direction parallel with a central longitudinal axis Y of the vehicle body 32. In the inwardly-rotated position, the front of the seat 10 (e.g., the occupant seating surface 28 of the backrest 14 and a front face of the seat bottom 12) is facing in a direction that intersects the longitudinal axis Y of the vehicle body 32. An angle of rotation a about the vertical axis Z is formed between the forward-facing and inwardly-rotated positions of the seat 10 and is also defined between a longitudinal axis L of the seat and the longitudinal axis Y of the vehicle body 32.

In this example, the angle of rotation a is illustrated at about 25 degrees. The angle $\alpha$ is between 0 and 90 degrees and is preferably in a range from 10 to 45 degrees. In various embodiments, the angle $\alpha$ is in a range from 15 to 35 degrees or 15 to 25 degrees. In one particular embodiment, the angle $\alpha$ is in a range from 15 to 20 degrees, which is a useful range for reducing potential motion sickness of the seated passenger and/or for meeting present day front or rear collision safety standards, although it is recognized that such standards may change over time. There may be a particular pre-determined value for the angle $\alpha$ that is one of several inwardly-rotated positions and at which the seat 10 and/or the coupling device 30 (FIG. 1) is configured to lock in place such that angular movement away from the inwardly-rotated position is prevented.

The illustrated vehicle body 32 has vertical pillars 44 on transversely opposite sides of the vehicle 38. The pillars 44 are structural members that interconnect a floor 46 and a roof (not shown) of the vehicle body 32 and are typically concealed from view in the passenger cabin 36 by a panel or other trim. Each pillar 44 is located along a rearward side of and partly defines a door opening 48 in the vehicle body 32. A door 50 configured for movement between open and closed positions is coupled with the vehicle body 32 at each door opening 48, with each door opening providing passenger access into and out of the passenger cabin 36 when the corresponding door is in the open position.

The seat 10, including each of the seat bottom 12 and backrest 14, has an inboard side 52 and an opposite outboard side 54 located between the inboard side and the door opening 48. As shown in FIG. 2, the vertical axis Z about which the seat rotates between the forward-facing and inwardly-rotated positions is located along the inboard side 50 of the seat 10 and of the seat bottom 12. The seat 10 is located in the passenger cabin 36 such that at least a portion of the seat and the vertical pillar are located at a common position along the longitudinal axis Y of the vehicle body 32. In the illustrated example, the backrest 14 of the seat 10 and the pillar 44 are at a common longitudinal position with respect to the vehicle body 32.

The illustrated inwardly-rotated seat position is unconventional but has been found to provide certain advantages. At times when driver attention is not required, such as in an autonomous vehicle mode or while the vehicle 38 is parked, the inwardly-rotated position offers additional leg room and/or freedom of movement for the seat occupant, a broader direct view through the windshield of the vehicle, and a decreased amount of body movement required to look at an occupant of another seat 10' in the row of seats, such as when conversing. The inwardly-rotated position offers the additional advantage of turning the seat occupant away from the pillar 44 and thereby potentially enhancing safety in the event of certain side-impact vehicle collisions. While there may be other safety considerations, a larger portion of any kinetic energy of the body of the seat occupant in the transverse direction toward the adjacent door opening 48 can be absorbed by the backrest 14 and/or headrest 24 with the seat 10 in the inwardly-rotated position compared to the forward-facing position.

Figure 3:
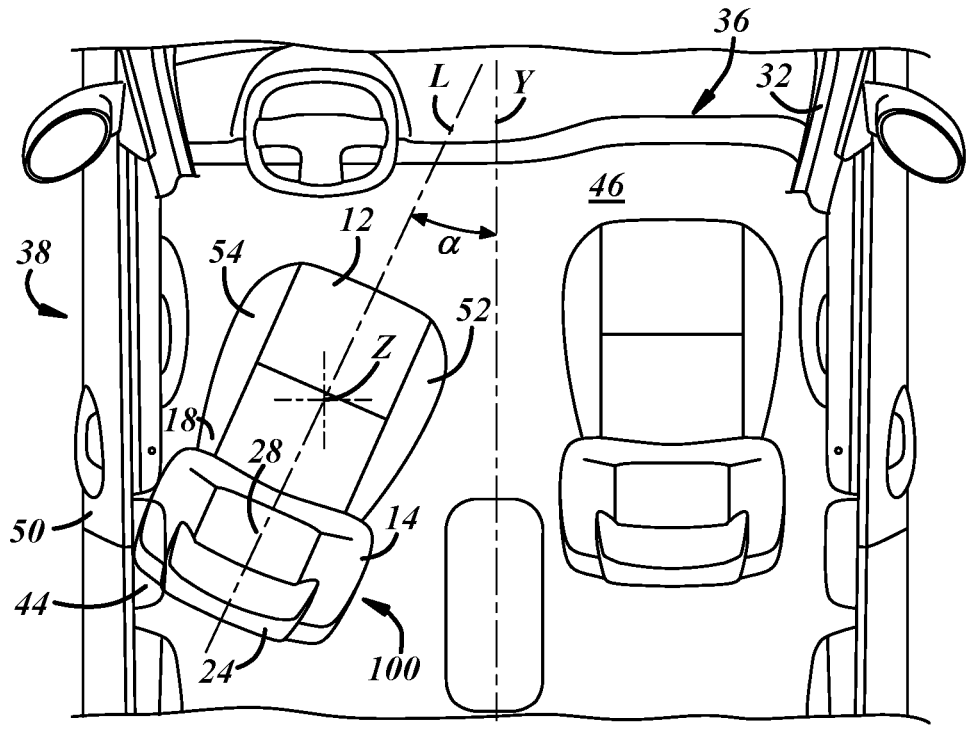
FIG. 3 is a top view of the reconfigurable passenger cabin of FIG. 2, illustrating the same seat inwardly-rotated about a central vertical axis and an associated interference condition.

Location of the vertical axis Z along a rearward inboard quadrant of the seat bottom 12 as shown helps facilitate seat rotation while avoiding interference with the vertically extending features along the perimeter of the passenger cabin 36, such as the pillar 44 and door 50. For purposes of comparison, FIG. 3 illustrates a problem encountered if the vertical rotational axis Z is centrally located with respect to the seat bottom 12 in the manner of a Lazy Susan or office chair—i.e., at a location where all four quadrants of the seat bottom meet. The seat 100 of FIG. 3 is inwardly-rotated by the same angle ($\alpha=25°$) away from an identical forward-facing position as that of FIG. 2 with only the location of the vertical axis Z being different. While such a centrally located axis of rotation Z may be workable for an outwardly-rotating vehicle seat to provide easier ingress or egress from the passenger cabin 36 with the vehicle door 50 open, FIG. 3 demonstrates at least one problem with an axis of rotation that is too far forward and too far toward the outboard side 54 of the seat: interference with the structures or trim along the perimeter of the passenger cabin 36. Defining the axis of rotation Z along the inboard side 52 of the seat and the rear side 18 of the seat bottom 12 enables non-interfering inward rotation of the seat 10 while the door 50 is in the closed position, as shown in FIG. 2.

Figure 4:
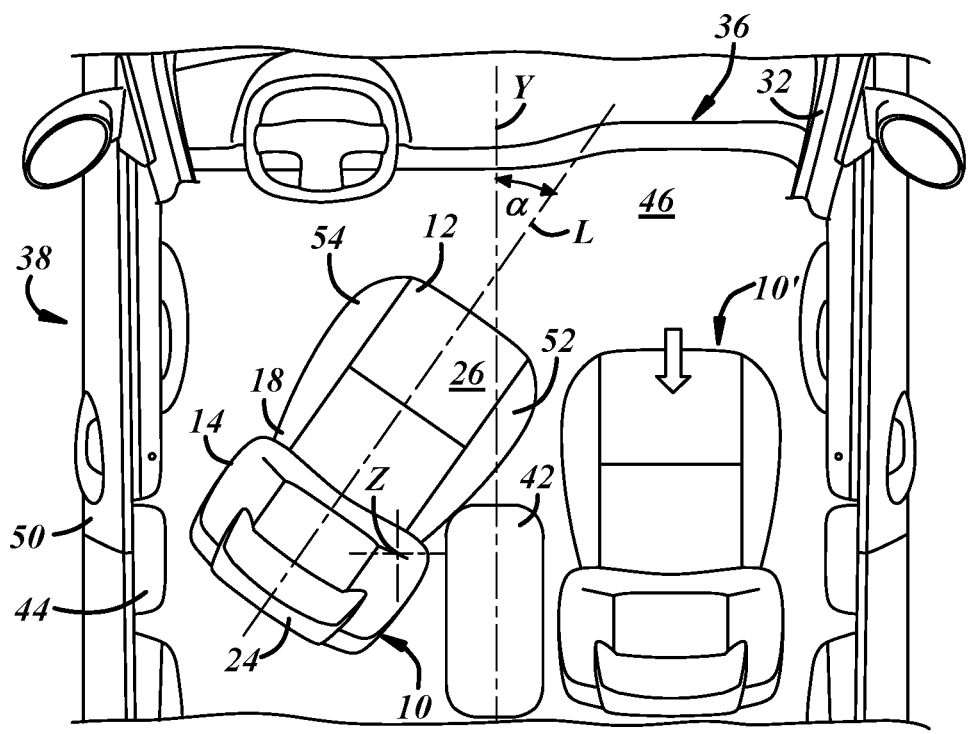
FIG. 4 is a top view of the reconfigurable passenger cabin of FIGS. 2 and 3, illustrating the same seat inwardly-rotated about a different vertical axis located farther rearward than in FIG. 2.

FIG. 4 illustrates an embodiment in which the vertical axis Z is located rearward of the seating surface 26 of the seat bottom 12, similar to that of FIG. 1. The vertical axis Z in the example of FIG. 4 is at the same lateral position along the inboard side of the seat 10 as in FIG. 2, but farther rearward with respect to the seat in the direction of the longitudinal axis L. One effect of the further rearward position of the vertical axis Z along the seat bottom 12 is larger possible values for the angle of rotation a without interference between the seat 10 and the internal physical boundaries of the passenger cabin 36, such as the pillar 44 or the door 50 and associated trim elements. The illustrated seat 10 is inwardly-rotated by $\alpha=35°$ in this case. As apparent in FIG. 4, further inward rotation is possible in the absence or relocation of the stowed console 42 or with further forward movement of the entire seat 10. At such an inwardly-rotated position, the backrest 14 may be adjusted (e.g., via a recliner mechanism) to allow the seat occupant to assume a further reclined position, particularly with the second seat 10' moved to a rearward position as shown.

Figure 5:
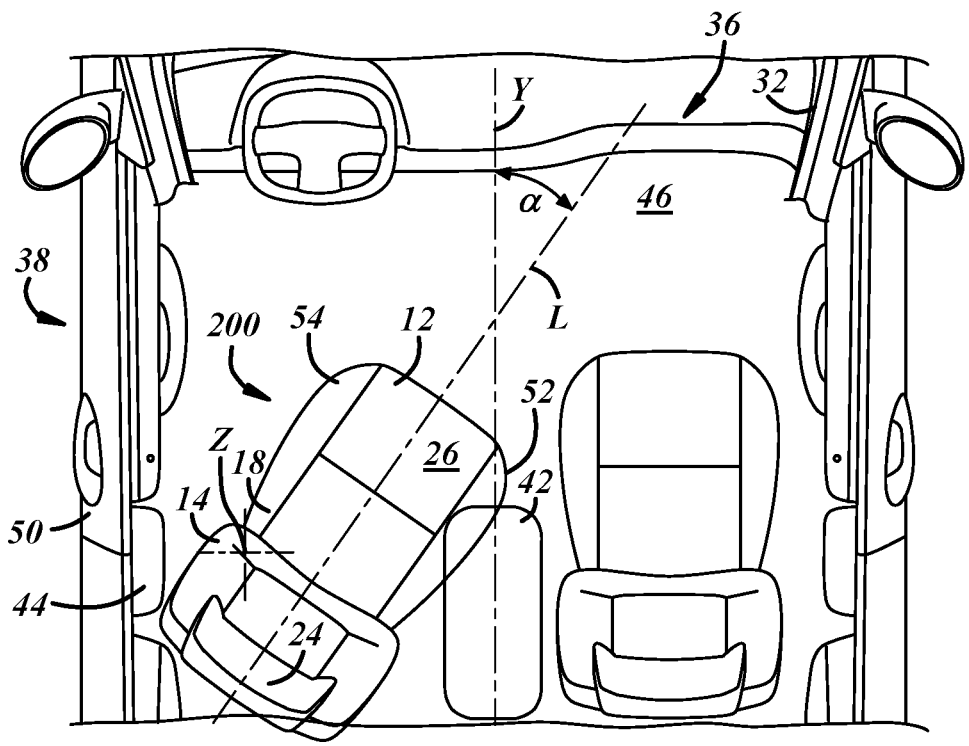
FIG. 5 is a top view of the interior of the passenger cabin of FIGS. 2-4, illustrating the same seat inwardly-rotated about a different vertical axis located farther outboard than in FIG. 4.

FIG. 5 illustrates another contrasting example demonstrating a problem that may be encountered if the vertical axis Z is located too far toward the outboard side 54 of the seat, even if located sufficiently far rearward. In this example, the vertical axis Z is located along the outboard side 54 of the seat 200 and the rear side 18 of the seat bottom 12—i.e., in a rearward outboard quadrant of the seat bottom. Starting from the same forward-facing position as the seat 10 of FIG. 4 and inwardly-rotated the same amount as in FIG. 4, the inboard side 52 of the seat 200 is shifted farther rearward with respect to the vehicle body 32. The entire seat 200, including the vertical axis Z, would have to be shifted farther forward in the passenger cabin 36 to avoid potential interference with a second row of seats or the stowed console 42, for example. But this is also problematic because the backrest 14 of the seat 200 may interfere with the pillar 44 or other vertically extending features along the perimeter of the passenger cabin 36. Similar to the comparative example of FIG. 3, this outboard rotational axis Z may be workable for a seat configured for outward rotation to provide enhanced ingress/egress with the vehicle door 50 open. But location of the vertical axis Z along the inboard side 52 of the seat as illustrated and discussed about provides certain advantages over outboard side 54 locations when the objective is to provide enhanced freedom of movement and/or safety via inward seat rotation with the vehicle door 50 closed.

As illustrated in the examples of FIGS. 2 and 4, the vertical axis Z is preferably located within an inboard quarter of the seat 10 or the seat bottom 12. If the overall width of the seat 10 as measured perpendicular to the longitudinal axis L is divided into equal quarter widths, the inboard quarter is the quarter width farthest away from the axis L in the direction of the inboard side 52 of the seat. Similarly, the vertical axis Z is preferably located within or rearward of a rearward quarter of the seat bottom 12. If the overall length of the seat bottom 12 as measured parallel with the longitudinal axis L is divided into equal quarter lengths, the rearward quarter is the quarter length farthest away from the front side 16 of the seat bottom in the direction of the axis L. Most preferably, the location of the vertical axis Z meets both of these criteria regarding its longitudinal and transverse position with respect to the seat 10 and seat bottom 12.

Figure 6:
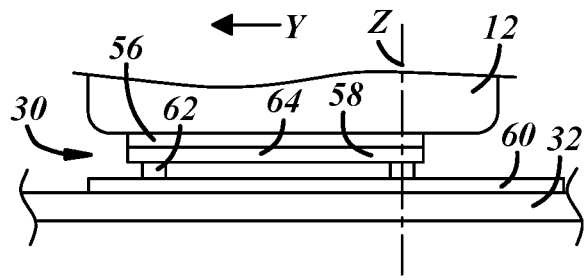
FIG. 6 is schematic side view of an example of a coupling device that couples the seat with the vehicle body.
Figure 7:
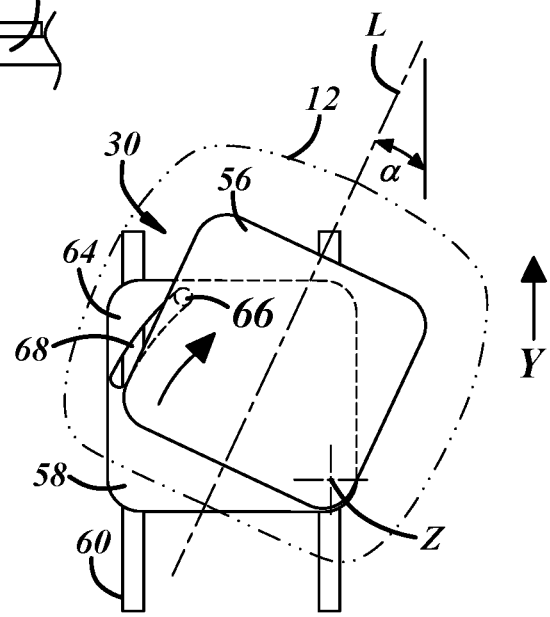
FIG. 7 is a schematic top view of the coupling device of FIG. 6 with the seat in the inwardly-rotated position.

The above-described coupling device 30 (FIG. 1) may take several forms, only one of which is schematically illustrated in the side view of FIG. 6 and top view of FIG. 7. FIG. 6 shows the coupling device 30 with the seat in the forward-facing position, and FIG. 7 shows the coupling device with the seat in the inwardly-rotated position with the seat bottom 12 in phantom. The coupling device 30 may include an upper portion 56 and a lower portion 58 coupled together for relative movement with respect to each other, with the movement including rotational movement about the vertical axis Z. The upper portion 56 is adapted for rigid attachment to the seat bottom 12 for movement therewith, and the lower portion 58 is adapted for rigid attachment to the vehicle body 32. In this example, the lower portion 58 includes rails or guides 60 oriented to extend parallel with the longitudinal axis Y of the vehicle body 32. The lower portion 58 further includes guide followers 62 extending from a top piece 64. The guide followers 62 are adapted to selectively lock and unlock with respect to the guides 60 to provide forward and rearward adjustment of the location of the seat within the passenger cabin. Any suitable fore-and-aft vehicle seat adjustment mechanism may be employed, many of which are known and thus not illustrated here.

In this example, the upper portion 56 of the coupling device 30 is pinned to the top piece 64 of the lower portion 58 via a pivot joint at the vertical axis Z and includes its own guide follower 66 configured to be guided along a curved guide 68 formed in the top piece 64 of the lower portion 58. The guide follower 66 or upper portion 56 is adapted to selectively lock and unlock with respect to the lower portion 58 of the coupling device 30, at least with the seat in the forward-facing position and in at least one inwardly-rotated position. While the upper portion 56 and the top piece 64 of the lower portion 58 are illustrated here in plate form, skilled artisans will recognize the schematic nature of FIGS. 6 and 7 and will devise similarly functioning coupling devices 30 that use less materials, are more compact than the illustrated example, and/or define the rotational axis Z in some other way.

In one embodiment, the coupling device 30 includes a linkage mechanism, such as a four-bar linkage, that enables definition of the vertical axis Z as a virtual axis at a location different from a physical pivot joint or pin of the linkage. Inclusion of a four-bar linkage in the coupling device can provide coordinated rotational and translational movement of the seat, such as rotation of the seat about the vertical axis Z and simultaneous translation of the seat in the direction of the longitudinal axis Y of the vehicle body 32. For instance, when moving from the forward-facing position to the inwardly-rotated position, the seat may inwardly rotate about the vertical axis Z while the seat, along with its rotational axis Z, also moves in the rearward direction of the vehicle body. Such a linkage is also useful to define the vertical axis at a location behind the seat bottom or seat without the need for the coupling device to physically extend behind the seat or seat bottom.

The coupling device 30 may also provide limitations on the amount of and/or the direction of movement of the seat. For instance, the angle of rotation α may be limited consistent with the above-discussed ranges. In some embodiments, outward rotation of the seat away from the forward-facing position is prevented by the coupling device, for example. In other embodiments, inward rotation of the seat beyond an angle of rotation α=90° is prevented—i.e., the seat cannot be turned toward the rear of the vehicle. In other examples, the coupling device prevents movement beyond the maximum end of any one of the above-disclosed ranges for the angle of rotation.

The coupling device 30 and associated seat movement may be configured for manual and/or automatic operation. Automated movement between the forward-facing and inwardly-rotated positions may be provided by mechanisms with known components such as a motor, solenoid, fluid-powered cylinder, or other actuator. Manual movement is of course also possible with various degrees of freedom provided by the coupling device as described above. Movement actuation may be initiated by user input received by a user input device (e.g., a switch or touch interface), or it may be initiated as part of an automated reconfiguration of the passenger cabin between the driving and autonomous configurations. For example, in the driving configuration, the seat 10 may be in a longitudinally forward position in the passenger cabin 36 while in the forward-facing position. When the vehicle changes to an autonomous mode, the seat 10 may translate to a rearward position and rotate to a pre-determined inwardly-rotated position, and another seat in the same row may move rearward in the passenger cabin 36. Seat movements may be coordinated, overlapping in time or occurring simultaneously, or they may happen sequentially. Once the seat 10 is in the inwardly-rotated position, further adjustments of the seat position may be possible, such as fore-and-aft adjustment in the passenger cabin, or return of the seat to the forward-facing position while maintaining the longitudinally rearward position of the seat.

In one example, the coupling device 30 is configured to provide adjustment of the seat location in the transverse direction of the vehicle body. For instance, the upper portion 56 of the exemplary device 30 of FIGS. 6 and 7 may include top and bottom pieces that are moveable and adjustable with respect to each other, with the top piece rigidly fixed to the seat and the bottom piece engaged with the lower portion 58 of the device 30. Of course, lateral movement of a vehicle seat is unconventional but has now been found useful in light of providing additional freedom of movement to the seated passenger via the described inwardly-rotating seat.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A personal automotive vehicle having a reconfigurable passenger cabin, comprising:
   a vehicle body having a vertical pillar and a longitudinal axis;
   a door opening that provides passenger access into and out of the passenger cabin, the door opening being partly defined by the vertical pillar;
   a seat comprising a seat bottom and a backrest and having an inboard side and an opposite outboard side located between the inboard side and the door opening, the seat bottom having a front side and an opposite rear side; and
   a coupling device that movably couples the seat with the vehicle body for movement between a forward-facing position and an inwardly-rotated position, said movement including rotation about a vertical axis extending through a point located along the inboard side of the seat and along or behind the rear side of the seat bottom,
   wherein the seat is located in the passenger cabin so that at least a portion of the seat is longitudinally located at the vertical pillar when the seat is in at least one of said positions, wherein the coupling device is adapted to selectively lock and unlock to respectively prevent and permit said movement, and wherein the coupling device prevents movement away from the forward-facing position toward an outwardly-rotated position when unlocked.

2. A personal automotive vehicle as defined in claim 1, wherein the vertical axis extends through a point located along the rear side of the seat bottom.

3. A personal automotive vehicle as defined in claim 1, wherein the vertical axis is located within a vertically projected area of the backrest.

4. A personal automotive vehicle as defined in claim 1, wherein the seat bottom comprises an occupant seating surface and the vertical axis is located rearward of the seating surface.

5. A personal automotive vehicle as defined in claim 1, wherein the seat is located in the passenger cabin so that at least a portion of the backrest is longitudinally located at the vertical pillar when the seat is in at least one of said positions.

6. A personal automotive vehicle as defined in claim 1, wherein the vertical axis is located within an inboard quarter of the seat.

7. A personal automotive vehicle as defined in claim 1, wherein the vertical axis is located forward of a rear side of a bottom end of the backrest.

8. A personal automotive vehicle as defined in claim 1, wherein the vertical axis is located rearward of a rear side of a bottom end of the backrest.

9. A personal automotive vehicle as defined in claim 1, wherein the vertical axis is moveable with respect to the vehicle body.

10. A personal automotive vehicle as defined in claim 1, wherein the seat is one of a front row of seats and is located on a driver side of the vehicle.

11. A personal automotive vehicle as defined in claim 1, wherein the vehicle has an autonomous mode and the passenger cabin is reconfigurable between a driving configuration, in which the seat is in the forward-facing position, and an autonomous configuration, in which the seat is in the inwardly-rotated position.

12. A personal automotive vehicle as defined in claim 1, wherein an angle of rotation between the forward-facing position and the inwardly-rotated position is a range from 15 degrees to 35 degrees.

13. A personal automotive vehicle as defined in claim 1, wherein the coupling device limits an angle of rotation between the forward-facing position and the inwardly-rotated position to a range from 15 degrees to 20 degrees.

* * * * *